Figure 1:
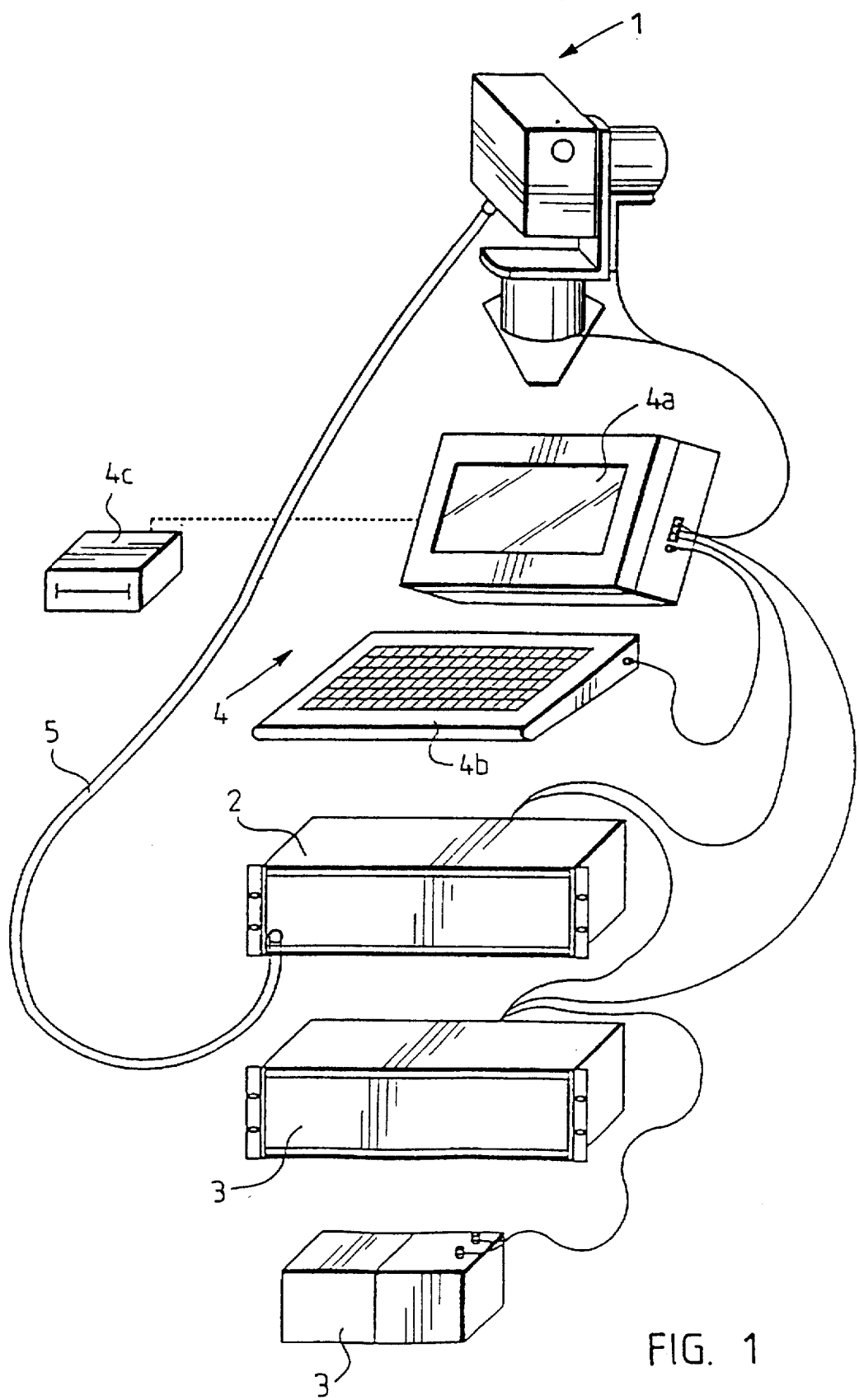

United States Patent [19]

Jokinen

[11] Patent Number: 5,546,176
[45] Date of Patent: Aug. 13, 1996

[54] METHOD FOR MEASURING WEAR IN THE LINING OF A CONTAINER PROVIDED WITH A PIVOTED AXLE AND AN OPENING, AND A CONTAINER

[75] Inventor: Hannu Jokinen, Oulunsalo, Finland

[73] Assignee: Spectra-Physics Visiontech OY, Oulu, Finland

[21] Appl. No.: 241,417

[22] Filed: May 11, 1994

[30] Foreign Application Priority Data

May 21, 1993 [FI] Finland ..................... 932339

[51] Int. Cl.⁶ ............... G01B 11/03; G01B 11/00
[52] U.S. Cl. ............. 356/5.1; 356/372; 356/376; 356/139.03; 356/141.2
[58] Field of Search ............ 356/139.03, 141.1, 356/152.2, 152.3, 372, 376, 5.01–5.15

[56] References Cited

U.S. PATENT DOCUMENTS

| 4,025,192 | 5/1977 | Scholdstrom et al. | 356/5.15 |
|---|---|---|---|
| 4,172,661 | 10/1979 | Marcus et al. | 356/152 |
| 4,227,802 | 10/1980 | Scholdstrom et al. | 356/5.15 |
| 4,508,448 | 4/1985 | Scholdstrom et al. | 356/5.15 |
| 4,721,388 | 1/1988 | Takagi et al. | |
| 5,125,745 | 6/1992 | Neiheisel et al. | |
| 5,212,738 | 5/1993 | Chande et al. | 356/376 |

*Primary Examiner*—Thomas H. Tarcza
*Assistant Examiner*—Pinchus M. Laufer
*Attorney, Agent, or Firm*—Sughrue, Mion, Zinn, Macpeak & Seas

[57] ABSTRACT

The invention relates to a method for measuring wear in the lining of a container provided with a pivoted axle and an opening, and a container. Fixing of the coordinate systems (16, 17) of a measuring device (1) and the container (6) is performed by measuring the position of fixing points (P1, P2, P3) in the coordinate system (16) of the measuring device, whereafter the i0 lining (10) on the inner surface of the container (6) is measured. The fixing is performed by measuring the position of the fixing points (P1, P2, P3) mounted in connection with the container in the coordinate system (16) of the measuring device (1) in a situation where the opening of the container faces away from the measuring device while the measuring device is directed towards the container bottom. The container (6) is rotated around its pivoted axle (11) to a position in which the opening (9) of the container (6) faces the measuring device (1). The fixing is performed utilizing the angle difference between angle data ($\alpha_1$) obtained during the measurement of the fixing points (P1, P2, P3) and angle data ($\alpha_2$) obtained after the rotation of the container (6), said angle difference being obtained by angle measurement known per se, measuring the inclination of the container (6).

7 Claims, 3 Drawing Sheets

METHOD FOR MEASURING WEAR IN THE LINING OF A CONTAINER PROVIDED WITH A PIVOTED AXLE AND AN OPENING, AND A CONTAINER

The invention relates to a method for measuring wear in the lining of a container provided with a pivoted axle and an opening, in which method fixing of the coordinate systems set for a measuring device and the container is performed by the measuring device emitting and receiving optical radiation, said fixing comprising mathematically combining the coordinate systems of the measuring device and the container by measuring the position of specific fixing points in the coordinate system of the measuring device and by measuring angle data on the inclined position of the container, and after the fixing the lining on the inner surface of the container is measured by directing optical radiation to the lining and receiving the radiation reflected from the lining.

The invention also relates to a container comprising a bottom, a wall, an opening and a lining on the inner surface thereof and provided with specific fixing points employed in the measurement of wear in the lining on the inner surface of the container in the fixing step, during which fixing of the coordinate systems set for the measuring device and the container is performed.

It is extremely significant to measure wear in the lining of a container, such as a converter or ladle used in steel making. This renders it possible to optimize the service life of the container and to prevent excessive wear in the lining from causing risks pertaining to production or industrial safety. Wear linings of converters must be renewed relatively often, as their life time varies from a week or two normally to no more than a few months, depending on what is melted in the converter, on the material of which the lining is made, and naturally on the number of meltings for which the converter is used. A converter can last for about 100 to 5000 meltings. The shorter the estimated life time of a lining, the greater is the need to perform daily wear measurements. It is obvious that in addition to normal, possibly daily, wear measurements it is necessary to perform modelling measurements of the unworn lining whenever a container provided with a new lining is brought into use.

The wear in a lining is measured by a method based on measuring the transit time or phase difference of a laser beam: the laser beam is directed to the lining on the inner surface of a converter, from which it is reflected back to the measuring device. On the basis of the time difference between the emitting time and the return time of the laser beam it is possible to calculate the distance between the measuring device and each measured point on the lining to be measured in a coordinate system of the measuring device. The measured points define the wear profile of the lining, which may be output for instance to a display terminal, by which the wear profile measured from a converter in use can be compared graphically and numerically with the profile that was measured of the inner surface of the same container during the modelling step before the container was actually brought into use, i.e. before the first melting.

To measure wear in the lining of three-dimensional objects, such as converters, ladles and other containers used in the steel industry, by non-contacting methods, such as laser measurement, requires that the measuring device and the object to be measured be represented in the same coordinate system. Combining the coordinate systems of the measuring device and the object to be measured is called fixing.

In the so-called direct procedure normally used for fixing, stationary fixing points are mounted on the object to be measured, i.e. a container. By means of the fixing points, the coordinate systems of the object and the measuring device can be mathematically combined. There must be at least three fixing points. The fixing points are, for example, small steel plates which reflect the beam emitted by the laser emitter of the measuring device; on the basis of the beam emitted by the measuring device and reflected from the fixing point it is possible to determine the distance between the object to be measured, e.g. a converter, and the measuring device. In the direct procedure, the object to be measured and the measuring device can be included in the same coordinate system by measuring at a time both the fixing points and the points to be actually measured. According to the existing direct measuring procedure, the fixing points are attached to the immediate vicinity of the converter opening, which thus makes both the area to be measured and the fixing points visible to the measuring device. The direct measuring procedure would be the easiest one, but in metallurgic industry, e.g. in steel making, the conditions are rather severe: very often splashes of molten metal or slag cower the fixing points either completely or partly, or there are splashes at least so close to the fixing points that loosening the splashes, for instance by an iron bar or the like, causes the fixing points to suffer mechanical blows, which changes the location of the fixing point. Variations of temperature and heat expansion may also cause problems, which in addition to the mechanical displacement of fixing points may also cause measuring errors. It must be emphasized that a displacement of a fixing point of e.g. 5 mm may be multiplied in the measuring results. Fixing points in the vicinity of the opening of a container may also be physically displaced as a result of the charging of the container, i.e. introduction of e.g. scrap iron into the container for melting.

There have been attempts to obviate the problems described above by positioning the fixing points slightly further away from the edge of the container opening. As a result of this, however, the fixing points fall outside the field of the measuring device, wherefore the measuring device must be removed further away from the object, or the container. However, removing the measuring device further away from the container results in the significant disadvantage that a sufficiently large area of the inner surface of the container is not visible to the measuring device in view of the actual measuring of the lining; the actual measuring must therefore be performed in several steps, and fixing must naturally be carried out again for each measurement. It is obvious that this procedure causes more measuring errors and, moreover, delays. Another previous method employs a so-called goniometer vertically positioned in front of the container.

In a special case where the object to be measured is supported by a pivoted axle, it is possible to use angle measurement fixing. An angle measuring device can be mounted, for example, on the pivoted axle of the container or elsewhere in the container in the case of a so-called inclinometer. At present, fixing by means of angle measurement is an indirect method which is used when it is impossible to provide the object to be measured with necessary fixing points which are clearly visible and whose position is even otherwise suitable.

Previously, angle measurement fixing has been performed using fixing points in structures outside the object to be measured and an angle value obtained from the angle measurement device, which has enabled mathematic combination of the coordinate systems. The fixing points have been attached, for example, to the frame structures of a factory hall in proximity to e.g. a converter. When angle measurement is used in the known methods, the angle measurement device informs the measuring device of the position of the object to be measured in relation to the known environment. It is obvious that fixing points positioned outside the object, i.e. a container, cause measuring errors and, moreover, complicate the computational realization of the measuring method.

The object of the present invention is to provide a new type of method which avoids the problems pertaining to the known solutions.

This is achieved with a method according to the invention, which is characterized in that the fixing is performed by measuring the position of the fixing points mounted in connection with the container in the coordinate system of the measuring device in a situation where the container opening faces away from the measuring device while the measuring device is directed towards the bottom of the container, whereafter the container is rotated around its pivoted axle to a position in which the opening of the container faces the measuring device, and that the fixing is performed utilizing the angle difference between angle data obtained during the measurement of the fixing points and angle data obtained after the rotation of the container, said angle difference being obtained by angle measurement known per se, measuring the inclination of the container.

The container according to the invention is characterized in that the fixing points are mounted in the area of the container bottom.

The method according to the invention is based on the idea that when angle measurement is used, fixing is performed from a quite different direction from wear measuring. The fixing points are measured in a situation where the measuring device is directed towards the rear end of the container, i.e. the bottom of the container. In the method, the fixing is most preferably performed in the area of the bottom of the object to be measured, i.e. a container, preferably in the planar circular bottom area of the container, i.e. from a completely opposite side and direction than in the prior art methods. To enable the actual measurement after the measurement of the fixing points, the container is rotated, preferably by 180 degrees, to a position in which the container opening faces the measuring device, whereby the measuring area, i.e. the lining on the inner surface of the container, is visible to the measuring device. The fixing points, e.g. small metal plates, that are necessary for the alignment of the measuring device with the object to be measured, i.e. in practice for the combination of the coordinate systems of the measuring device and the object, are positioned in the bottom area of the object, or the container. An angle measuring device, such as an inclinometer, gives the angle difference between the fixing moment and the starting of the actual measurement; the angle difference is caused by rotation of the container around its pivoted axle. Information on angle difference measurement and data on the rotational geometry and dimensions of the container are utilized for combining the coordinate systems of the object, or the container, and the measuring device. The method according to the invention has several advantages, which are the result of fixing performed by the new method, i.e. the alignment of the measuring device with the object to be measured. As to measurement geometry and visibility, the fixing points can be optimally positioned. In view of the timing of the process, the present method is advantageous, as preparations for the measurement (in practice the fixing) can be made during the process, e.g. during discharge of slag or steel, from a completely different direction, i.e. from the direction of the container bottom.

With respect to industrial safety, the new method is advantageous, as the measuring device can be brought to a hot, possibly spattering container, such as a converter, to its sheltered bottom side while the opening of the converter faces away from the measuring device. The bottom of a container, e.g. a converter, is a sheltered area where the fixing points are not subjected to splashes of slag. In the bottom area, where the temperature is stable as compared with the temperature of the opening area, the fixing points are protected against mechanical blows caused by charging, cleaning and other treatment carried out through the opening of the converter. The measuring device can often be placed in closer proximity to the converter than the prior art devices, whereby in most cases a sufficient measuring area is visible to the measuring device at a time through the visual field restricted by the opening. By means of the present solution it is possible to come so close to the object to be measured, e.g. a converter, that areas that have previously been rather difficult to measure but are, however, subject to heavy wear, e.g. the points in the converter lining where the pivoted axle is positioned, can be measured by one fixing and one measurement without changing the position of the measuring device and the converter in relation to each other. The new method does not require additional structures or new measuring instruments, but it may employ existing devices; basically the new method is a new embodiment of the fixing function in which the measurement of the fixing points in the container is followed by rotation of the container before the actual measurement of the lining. By means of the new method the entire measurement can be robotized. The known containers have the same drawbacks as the known methods, as the fixing points are positioned in the vicinity of the container opening. The advantages of the present container correspond to those achieved with the method of the invention.

Figure 2:
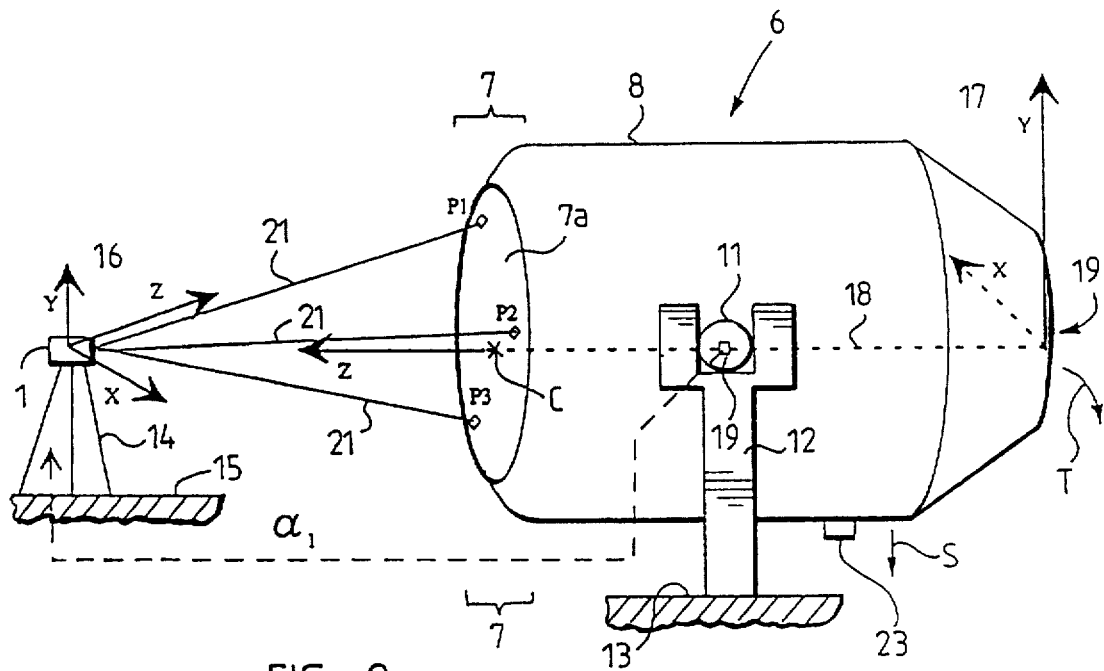
Figure 3:
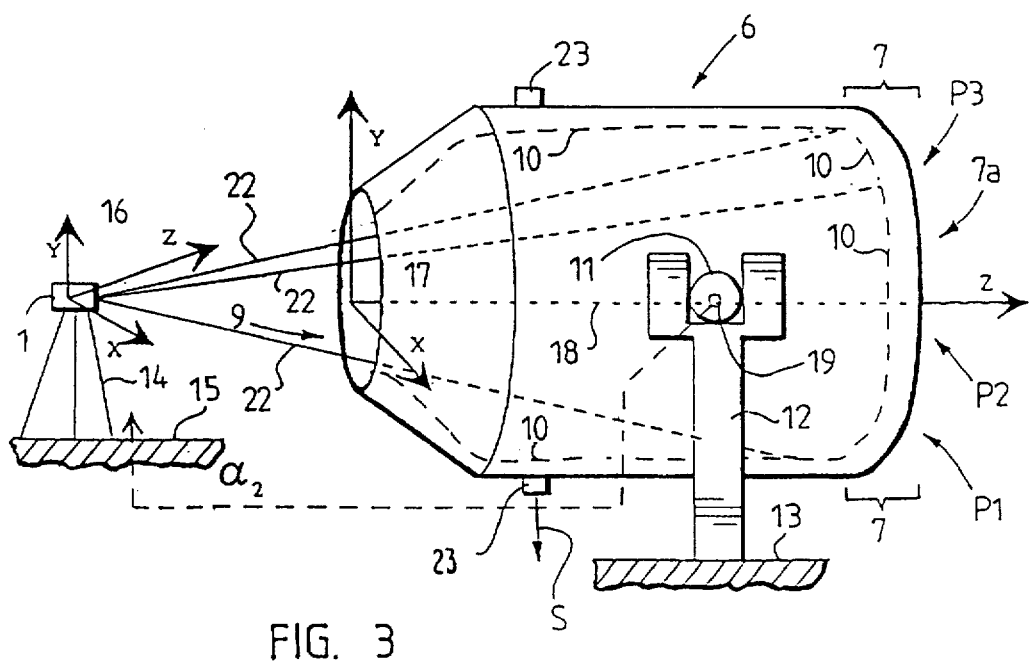
Figure 4:
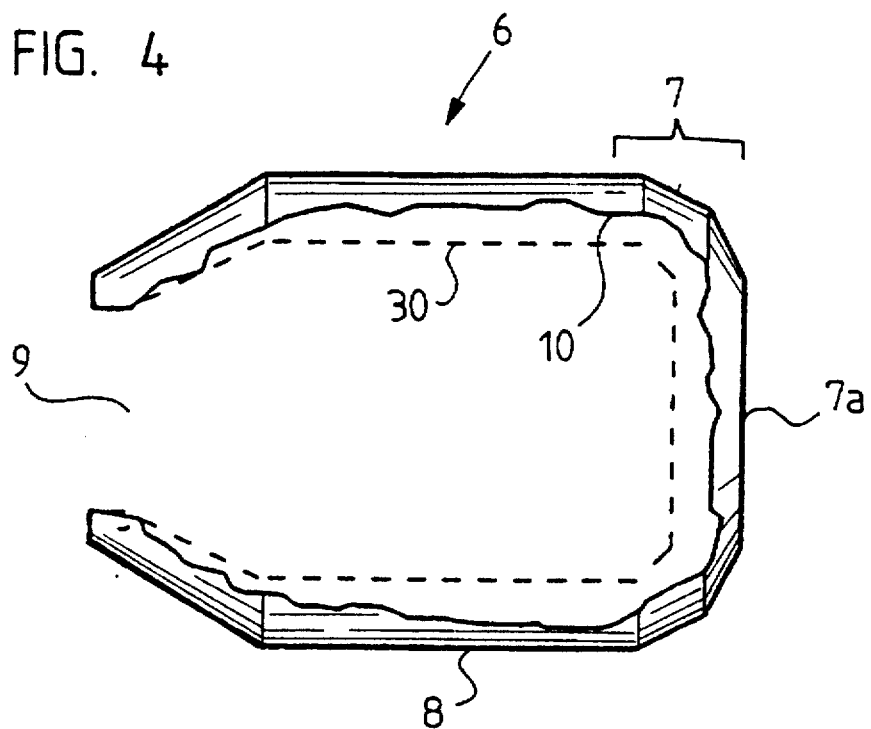
Figure 5:
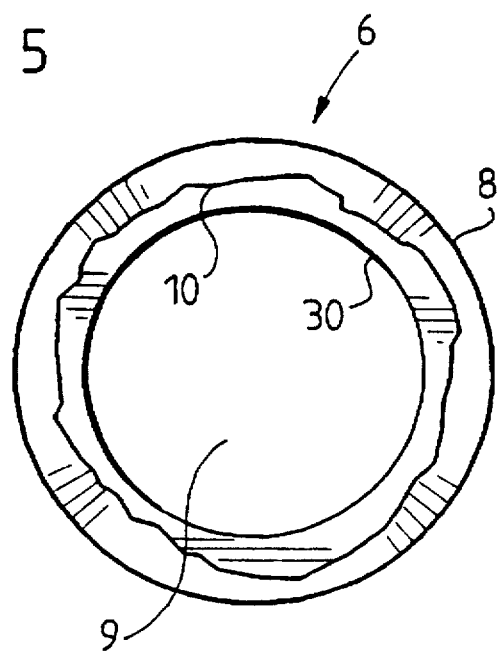

In the following the invention will be described in greater detail with reference to the accompanying drawings, in which FIG. 1 shows a measuring apparatus, FIG. 2 illustrates the fixing step of the measuring method, FIG. 3 illustrates the actual measuring step of the measuring method, FIG. 4 is a reference diagram of a worn container as compared with an unworn one, FIG. 5 is a reference diagram in accordance with FIG. 4, seen in the longitudinal direction of the container.

FIG. 1 shows the configuration of a measuring apparatus corresponding to an apparatus presently in use. The apparatus comprises an optical transceiver 1, preferably a laser transceiver, distance measurement electronics 2, a power supply 3, and a control unit 4 comprising a display 4a, a keyboard 4b and a disk drive 4c. The laser transceiver 1 is connected to the distance measurement electronics 2 through a cable 5, comprising three optical fibers, which in conjunction with the distance measurement electronics enable measurement of the transit time of a laser pulse. However, what is essential in the present invention is a new method for performing fixing of the coordinate systems of the measuring device and the object to be measured by the use of measuring devices known per se.

FIG. 2 illustrates the fixing step of the measuring method, and FIG. 3 illustrates the actual measuring step. FIGS. 2 and 3 show the object to be measured,. i.e. a container 6 comprising a bottom 7, a wall 8, an opening 9, and a lining 10 to be measured. The container 6, such as a converter, is hung on its pivoted axle 11, which is supported by an axle support 12, which in turn is supported by a lower support surface 13, which in practice is the floor of the lower level of the factory hall. The actual measuring device, of which FIGS. 2 and 3 show the laser transceiver 1 and its three-legged support 14, is disposed on an upper support surface 15 on the upper level of the factory hall.

FIGS. 2 and 3 also show the coordinate system 16 of the measuring device with x-, y- and z-axes. The coordinate system 17 of the object to be measured, i.e. the container, comprises correspondingly x-, y- and z-axes. It can be seen from FIGS. 2 and 3 that, mathematically, the coordinate system 17 of the container, or the object to be measured, is set on a plane with the opening 9 of the container. In FIGS. 2 and 3 the center of the coordinate system 17 is in the middle of the opening 9, and the z-axis of the coordinate system 17 extends along the longitudinal axis 18 of the object, or container.

In addition, FIGS. 2 and 3 show an angle measuring device 19, which measures the inclination of the container and is most preferably disposed on the pivoted axle 11 of the container 6. Angle measurement data can be transmitted to the measuring device via a cable or a radio path, or the angle measurement device 19 may be connected to the display device, from which the operator of the measuring device 1 picks the data and feeds it to the measuring device.

According to the method, the lining of the container 6 is measured in such a way that at first a measuring device 1 emitting and receiving optical radiation fixes the coordinate systems 16 and 17 set for the measuring device 1 and the container 6. The coordinate systems 16, 17 of the measuring device and the container are mathematically combined by measuring the position of specific fixing points P1, P2, P3 in the coordinate system of the measuring device. In addition, angle data on the inclination of the container 6 is measured by an angle measurement device 19. After the fixing, the lining on the inner surface of the container is measured. In the new method according to the invention, the fixing is performed by measuring the position of the fixing points P1, P2, P3 in the coordinate system 16 in the bottom 7 area of the container 6 by the use of fixing points P1, P2, P3 positioned therein. Thereafter the container 6 is rotated around its pivoted axle 11 to a position where the opening 9 of the container 6 faces the measuring device 1 as shown in FIG. 3. For the fixing, the present method also utilizes the angle difference between angle data $\alpha_1$ obtained during the measurement of the fixing points P1, P2, P3 and angle data $\alpha_2$ obtained after the rotation of the container. The angle difference is obtained by an angle measuring device 19 known per se, measuring the inclination of the container 6. The outer bottom 7 of the container refers to the area of the container which is at the opposite end to the opening 9. The bottom 7 comprises thus the end portion of the wall 8, the actual circular bottom portion 7a and optionally a usually slanting or curved area therebetween.

In the measurement of the fixing points P1, P2, P3, optical radiation is directed by the transmitter of the laser transceiver 1 to the fixing points P1, P2, P3; the radiation reflected from the fixing points P1, P2, P3 is received by the receiver of the laser transceiver 1.

In a preferred embodiment the fixing points P1, P2, P3 are surface treated so that their reflectivity is of the same order as that of the lining on the inner surface of the container 6. In view of the dynamics of the measuring device 1, this is the best possible situation, as the same receiver unit of the measuring device 1, in practice the receiver detector of the laser transceiver, receives both laser beams 21 reflected from the fixing points P1, P2, P3 in the fixing step as shown in FIG. 2 and laser beams 22 reflected from the lining 10 on the inner surface of the container in the actual measuring step.

From FIGS. 2 and 3 it can be seen that in a preferred embodiment, in order for the calculation to be simplified, the z-axis of the coordinate system 17 of the container 6 is arranged to pass through the center C of the circle defined by the fixing points P1, P2, P3 disposed at the opposite end, i.e. on the bottom 7, of the object to be measured. Further, in the preferred embodiment the fixing points P1, P2, P3 form an equilateral triangle on the bottom 7 of the container, which reduces measuring errors.

In a preferred embodiment the fixing points P1, P2, P3 are measured from fixing points P1, P2, P3 positioned within the area of the circular bottom portion 7a of the container on the circumference of as larvae a circle as possible on a level with each other. Thus the fixing points P1, P2, P3 within the area of the circular bottom portion 7a, such as a bottom calotte, are sheltered in the best possible manner, the visibility to the measuring device 1 is good, and they have the most advantageous position in view of the calculation.

In a preferred embodiment the container is rotated between the measurement of the fixing points P1, P2, P3 and the actual measurement of the lining 10 of the container by 145 to 225 degrees, preferably about 180 degrees, as can be seen by comparing FIGS. 2 and 3. Such rotation ensures that the conditions regarding visibility are good during both the measurement of the fixing points in the bottom area and the actual measurement of the lining 10 after the rotation.

In a preferred embodiment the measurement of the fixing points P1, P2, P3 is performed during pouring out and/or drainage of the contents from the container 6 from a substantially opposite direction to the direction which the opening 9 of the container 6 faces as shown in FIG. 2. In this connection, measuring from an opposite direction is not restricted to the situation illustrated in FIGS. 2 and 3, where the difference between the measurement direction of the fixing points and the pouring/drainage direction is 180 degrees, but the term 'opposite' should be understood to cover all cases where the fixing measurement is performed from one side of an imaginary vertical line and the pouring out/drainage takes place on the other side of said line. It is thus essential that the fixing measurement is performed from a direction which is clearly different from the pouring/drainage direction. The expression 'contents of the container' refers to the actual useful material, such as molten steel, and slag formed in the container. FIG. 2 shows a drain valve 23, through which the material, such as molten steel, contained in the container 6, e.g. a converter, is drained in the direction of arrow S. In this case, fixing is effected in connection with the drainage of the actual contents of the container 6, e.g. steel. Another alternative, which is also a more practical one, is that the actual useful material, e.g. steel, is drained from the container 6 at an earlier stage. In this case the steel is drained through the drain valve 23 in a position according to FIG. 3, whereafter the container 6 is rotated to a position according to FIG. 2, in which the container 6 is kept at least during the measurement of the fixing points P1, P2, P3. Thereafter slag is poured out of the container 6 in the direction of arrow T by further inclining the container, if necessary, and as a final stage after the inclination has stopped in the situation illustrated in FIG. 3, the actual measurement of the lining 10 can be performed. This preferred embodiment utilizes efficiently the rotations of the container 6 that are presently used in metallurgical manufacturing processes. Rotating the container 6 between the discharge of steel and the discharge of slag affords the advantage that the drain valve used in the discharge of steel is not clogged with slag.

In a preferred embodiment the measurement of the fixing points P1, P2, P3 is thus performed after the rotation of the container, which is effected after the discharge the useful material, such as steel, prior to or at the same time as the pouring out of the slag. Whether the fixing is effected prior to the pouring out of the slag or during it depends on the position to which the container 6 is inclined before the measurement of the fixing points.

In the prior art methods and even in the present method a modelling measurement is performed for a container before the container is brought into use to enable comparison between the measurement data obtained before and after use. The modelling measurement comprises a fixing measurement and the actual measurement of the unworn inner surface of the container. In FIGS. 4 and 5 line 30 represents the surface of the lining in a new container 6, and curve 10 illustrates the surface of the worn lining, obtained by measuring with a measuring device 1. In a preferred embodiment the container 6 is rotated even in the modelling measurement to a substantially opposite direction between the measurement of the coordinates of the fixing points P1, P2, P3 and the actual measurement of the lining 10 of the container 6. Performing the modelling in the same manner as the measurement minimizes the errors caused by fixing. Modelling and measuring are thus identical procedures, which simplifies the use of the method. Rotation to the opposite direction is not restricted to the situation illustrated in FIGS. 2 and 3, where the rotation is 180 degrees, but the number of degrees may also differ significantly from the one mentioned above; what is essential is that the fixing is performed from a substantially different direction from the actual measuring.

For the analysis of the measurement results it is necessary to have the x-, y- and z-coordinates of the measured points and the coordinates of the fixing points, by means of which the coordinate systems have been interconnected in the modelling and measuring steps by calculating the points as x-, y- and z-values in the same coordinate system. In the fixing step it is necessary to have angle values and, in addition, information on the distance between the pivoted axle 11 and the opening 9 (when the x-y plane is fixed on a plane with the opening).

Measurement of the coordinates of the fixing points P1, P2, P3 attached to the object to be measured, i.e. the container, in the coordinate system 16 of the measuring device is performed from a substantially opposite direction to the actual measurement of the lining 10 of the container 6, which is performed after the fixing.

In a method employing angle measurement known per se, the position of the fixing points P1, P2, P3 disposed on the bottom 7 of the container 6 is measured in the coordinate system 16 of the measuring device. Angle data $\alpha_1$ on the inclination of the container 6 is measured in the position in which the fixing points P1, P2, P3 on the bottom 7 of the container 6 are measured. Thereafter the container is rotated on its pivoted axle 11 to a position in which the opening 9 of the container 6 faces the measuring device 1. New angle data $\alpha_2$ on the inclination of the container 6 in the position in which the actual measurement of the container is performed is measured in a manner known per se by the same angle measuring device 19 as the first angle data $\alpha_1$.

In brief, the principle of the method according to the invention is as follows: a measuring device is brought to a suitable place in proximity to a container 6, whereafter fixing points P1, P2, P3 are fixed in the system of x-, y- and z-coordinates 17 of the measuring device, and some data on the container are given, e.g. the relation of the plane defined by the fixing points P1, P2, P3 to the axle 11 or the relation of the opening 9 to the axle 11, as a coordinate system 16 is also to be set for the object to be measured, i.e. the container 6. Thereafter the container 6 is rotated to a position as shown in FIG. 3, and the new situation is indicated in the coordinate system 16 of the measuring device by means of an angle $\alpha_1$ measured before the rotation and an angle $\alpha_2$ measured after the rotation, in practice by means of the angle difference between them. Finally the desired points on the lining 10 of the container are measured in the coordinate system 16 of the measuring device. The measured worn lining is compared with the lining measured in the modelling step as shown in FIGS. 4 and 5, for instance on the screen 4a of the display terminal shown in FIG. 1.

Although the invention has been described above with reference to the examples according to the accompanying drawings, it will be obvious that the invention is not restricted thereto but can be modified in many ways within the scope of the inventive concept disclosed in the appended claims.

I claim:

1. A method for measuring wear in the lining of a container provided with a pivoted axle and an opening, in which method fixing of the coordinate systems (16, 17) set for a measuring device (1) and the container (6) is performed by the measuring device (1) emitting and receiving optical radiation, said fixing comprising mathematically combining the coordinate systems (16, 17) of the measuring device (1) and the container (6) by measuring the position of specific fixing points (P1, P2, P3) in the coordinate system (16) of the measuring device (1) and by measuring angle data ($\alpha_1$, $\alpha_2$) on the inclined position of the container (6), and after the fixing the lining (10) on the inner surface of the container (6) is measured by directing optical radiation to the lining (10) and receiving the radiation reflected from the lining (10), characterized in that the fixing is performed by measuring the position of the fixing points (P1, P2, P3) mounted in connection with the container in the coordinate system (16) of the measuring device (1) in a situation where the container opening faces away from the measuring device while the measuring device is directed towards the bottom of the container, whereafter the container (6) is rotated around its pivoted axle (11) to a position in which the opening (9) of the container (6) faces the measuring device (1), and that the fixing is performed utilizing the angle difference between angle data ($\alpha_1$) obtained during the measurement of the fixing points (P1, P2, P3) and angle data ($\alpha_2$) obtained after the rotation of the container, said angle difference being obtained by angle measurement known per se, measuring the inclination of the container (6).

2. A method according to claim 1, characterized in that the position of the fixing points (P1, P2, P3) in the coordinate system (16) of the measuring device (1) is measured in the area of the bottom (7) of the container (6) by the use of the fixing points (P1, P2, P3) mounted therein.

3. A method according to claim 1, characterized in that the container (6) is rotated between the measurement of the fixing points (P1, P2, P3) and the actual measurement of the lining (10) by 145 to 225 degrees, most preferably by about 180 degrees.

4. A method according to claim 1, characterized in that the measurement of the fixing points (P1, P2, P3) is performed in connection with the pouring out and/or draining of the contents of the container (6) from a substantially opposite direction to the opening (9) of the container (6).

5. A method according to claim 1, characterized in that the fixing points (P1, P2, P3) are measured from the fixing points (P1, P2, P3) mounted in the area of the circular bottom (7a) of the container (6) in such a manner that they are centered with respect to the longitudinal axis (18).

6. A method according to claim 1, in which method a new container (6) is subjected to a modelling measurement prior to being brought into use to enable comparison between the measurement data obtained before and after use, said modelling measurement comprising fixing measurement and the actual measurement of the unworn lining of the container, characterized in that even in the modelling measurement the container (6) is rotated in a substantially opposite direction between the measurement of the coordinates of the fixing points (P1, P2, P3) and the actual measurement of the lining (10) of the container (6).

7. A method according to claim 1, characterized in that the z-axis of the coordinate system (17) set on a plane with the opening (9) of the container (6) extends through the center (C) of the circle defined by the fixing points (P1, P2, P3) mounted on the bottom (7) of the container (6).

* * * * *